United States Patent [19]
Brey et al.

[11] Patent Number: 5,274,646
[45] Date of Patent: Dec. 28, 1993

[54] EXCESSIVE ERROR CORRECTION CONTROL

[75] Inventors: Thomas M. Brey, Hyde Park; Matthew A. Krygowski, Hopewell Junction; Bruce L. McGilvray, Pleasant Valley; Trinh H. Nguyen, Wappingers Falls; William W. Shen, Poughkeepsie; Arthur J. Sutton, Cold Spring, all of N.Y.

[73] Assignee: International Business Machines Corporation, Armonk, N.Y.

[21] Appl. No.: 686,721

[22] Filed: Apr. 17, 1991

[51] Int. Cl.⁵ ........................................... G06F 11/10
[52] U.S. Cl. ..................................... 371/40.1; 371/13; 371/21.6
[58] Field of Search ....................... 371/13, 40.1, 40.2, 371/21.6; 395/575

[56] References Cited

U.S. PATENT DOCUMENTS

| | | | |
|---|---|---|---|
| 4,175,692 | 11/1979 | Watanabe | 371/40.2 |
| 4,458,349 | 7/1984 | Aichelmann, Jr. et al. | 371/13 |
| 4,604,751 | 8/1986 | Aichelmann, Jr. et al. | 371/21.6 |
| 4,661,955 | 4/1987 | Arlington et al. | 371/13 |
| 4,888,773 | 12/1989 | Arlington et al. | 371/40.2 |
| 4,964,129 | 10/1990 | Bowden, III et al. | 371/40.2 |
| 5,058,115 | 10/1991 | Blake et al. | 371/40.1 |

*Primary Examiner*—Charles E. Atkinson
*Attorney, Agent, or Firm*—Bernard M. Goldman

[57] ABSTRACT

A method of automatically invoking a recoverable and fault tolerant implementation of the complemented/re-complemented (C/R) error correction method without the assistance of a service processor when an excessive error is detected in main storage (MS) by ECC logic circuits. An excessive error is not correctable by the ECC. These novel changes to the C/R method increase its effectiveness and protect the C/R hardware against random failure. Further, if an excessive error is corrected in a page in MS, an excessive error reporting process is provided for controlling the reporting using a storage map to determine if a previous correction in that page has been reported. If it has been reported, then no further reporting of soft excessive errors is made for that page. A service processor is signaled in parallel to update its persistent copy of the storage map so that on a next initializations of MS the memory map can be restored in the memory. The memory map is used to assist the repair of failing parts of MS, and is reset after MS is repaired.

24 Claims, 7 Drawing Sheets

EXCESSIVE ERROR CORRECTION CONTROL

INTRODUCTION

The invention pertains to excessive error correction, its control, and its management in an efficient manner. An excessive error is an erroneous bit that cannot be corrected by the ECC (error correction code) provided with the data unit stored in a memory, such as the random access memory in a computer system.

BACKGROUND OF THE INVENTION

The complement/recomplement (C/R) type of error correction was disclosed in U.S. Pat. No. 3,949,208 entitled "Apparatus for Detecting and Correcting Errors in an Encoded Memory Word" to M. C. Carter and assigned to the same assignee as the subject application. The C/R technique has been used to augment the error correction capability of Hamming type ECCs (error correction codes) for data units stored in the memory of a computer system. The C/R technique has been used to correct one or more hard (H) errors in a data unit, leaving the ECC to correct any soft (S) error in the data unit.

A hard error is an error caused by a permanent fault in a circuit, such as a broken wire, and causes a bit position in memory to be stuck permanently in a given state, either a 1 or 0 state. A soft error is usually caused by an alpha particle changing the 0 or 1 state of a circuit, wherein a soft error condition will not exist the next time other data is stored in that circuit. Thus a hard error remains permanently in the hardware while a soft error exists only in the single recording of a data unit. The C/R method corrects only the permanently stuck state of hard errors. The C/R method may be used with computer storage built with semiconductor dynamic random access memory (DRAM) semiconductor chips.

The C/R method is initiated only after the ECC in a data unit finds an excessive error. Then the C/R process reads and complements (inverts) each read bit value in the data unit. Then the C/R process stores the inverted data unit back into the same bit locations in memory. When stored in their original locations, only the erroneous bits in hard error locations revert to their prior stuck states. All non-erroneous bits, and any erroneous bits with soft errors, will be inverted in relation to the stuck bits with hard errors which will not be inverted because of their stuck condition. A second fetch of the stored inverted data unit again inverts the read bits to correct all hard errors; and the ECC is then used only to correct any soft errors up to the maximum capability of the ECC. After this second inversion and at the end of the C/R process, the data unit is again stored in memory in its original location in its original erroneous form.

ECCs (error correcting codes) have been commonly used in DRAM (dynamic random access memory) storage by large computer systems, i.e. main storage (MS) and extended storage (ES). The most commonly used ECC has been for the SEC/DED (single error correction/ double error detection), which can detect, but cannot correct, double-bit errors in any data unit (DU) when the DU is stored or transferred. If a second bit error (an excessive error) is detected in a DU when using such SEC/DED type of ECC, the second erroneous bit cannot be corrected by the ECC. However, the second erroneous bit (the excessive error in a system using SEC/DED) often can be corrected by the C/R method for the transmission of the data, in which the C/R method can correct any number of hard errors (H) and but can only correct a single soft error (S) per DU. Accordingly, the combination of the C/R method and ECC can correct during transmission any number of hard and soft errors in a data unit up to the error detection capability of the ECC.

It is the transient characteristic of soft errors that prevents the C/R method from correcting any soft errors in a data unit. It is the ECC which corrects the soft errors. Hence, the combined C/R and ECC (SEC/DED) methods are limited to correcting one soft error in the transmission of a data unit, and the occurrence of two soft errors (the S-S case) is uncorrectable.

Both of the C/R or ECC methods are limited to correcting stored errors only during the transmission of a data unit. The hard or soft errors existing in the data unit in memory remain in the memory from which the transmission occurred. The C/R method can only correct the complemented (inverted) readout of a memory data unit which is stored with hard errors.

After the successful completion of the C/R process, the stored data unit remains with the same erroneous bits in memory, but the requestor receives a corrected data unit if the number of soft errors does not exceed the ECC capability. The C/R method provides complete error correction if there are no the soft error bits. And the C/R method enables complete error correction after it corrects all hard errors if the soft error bits can be corrected by the ECC. No error correction is obtained if the number of soft errors exceeds the capability of the ECC. For example, two soft errors in a data unit (the S-S error case) are not correctable by the C/R method if the maximum ECC capability is one erroneous bit per data unit.

The C/R method is much slower than the ECC correction process alone, because the C/R method requires two additional fetches and two additional stores in memory. Accordingly, the C/R method is not invoked unless an excessive error is detected. For example when using an SEC/DED type of ECC, only two error bits per data unit can be detected. If only one error is detected (no excessive error exists), it is corrected by the ECC without initiating the C/R method.

Although the C/R method can correct any number of permanent (hard) errors in a data unit, it may be limited by the maximum error detection capability of the ECC, since ECC error detection is used to control the initiation of the C/R method.

The C/R error correction technique has been effectively used in commercial computer systems having SEC/DED (single error correction/double error detection) ECC stored in memory to correct two errors in a data unit; the ECC alone has a maximum ability to correct a single error in a data unit. If the data unit has a hard error bit and a soft error bit (herein called the H-S case), the ECC correction is applied to the single soft error bit after the C/R operation has corrected the hard error bit.

Currently used large computer systems desiring the best type of maintenance store a record of the occurrence of all excessive errors, whether corrected or not. This is because excessive errors are not corrected in memory, even though excessive errors may be corrected for a requestor by using the C/R method to keep a task executing that would otherwise have to quit. Hence excessive error correction by the C/R method is considered outside the normal error correction ability of the system. A C/R corrected data unit is vulnerable to crashing the system if another soft error occurs in it.

Other pertinent art was published in 1980 by Bossen and Hsaio in the IBM Research Journal, May 1980, page 390 entitled "A System Solution to Memory Soft Errors".

Stringent error reporting and accounting have been used to insure closely coordinated system maintenance in prior large computer systems. They report excessive errors to a service processor (SP) in the system which maintains records of all significant error conditions occurring in the system to determine, for example, when to switch a CPU off line to perform maintenance.

Previously, an interruption was required to both the requesting processor and to memory operation before the C/R method could be invoked. C/R invocation occurred in response to the occurrence of error detection which cause both the processor clock and the memory access to be stopped until the processor has recovered, and an interruption signal to be sent to the system service processor (SP). Then the SP interrupted its current program and performed a recovery action on the stopped processor, which was usually to retry the instruction which stopped executing when the processor's clock was stopped. After the recovery action was completed, the SP restarted the processor and the memory resumed access for normal operation. Then the processor issued a re-fetch request that invoked the C/R method for the data unit having the excessive error. If the excessive error existed after operation of the C/R method, another processor stoppage occurred, etc. The next time the processor was restarted, it could record instruction processor damage to the task.

This prior operation of the C/R method was very slow because of the clock-stopping interruption to the requestor and to stopping memory access, and the SP intervention before the C/R method could be invoked, which greatly reduced the efficiency of the system, involving milliseconds instead of the normal CPU microsecond speed for each operation of the C/R method. System performance was further severely degraded due to a machine check interruption causing a loss of all data in the CPU's cache, and a loss of all translations in the CPU's TLB (translation lookaside buffer), adding to the reduction in CPU performance due to the need to refetch all data lost in the cache and to retranslate all addresses lost in the TLB. The program task was ABENDed (abnormally ended) by a machine check interruption if the data was not corrected.

C/R error correction does not correct any hard error or any soft error in the memory itself, even though the C/R method may correct the hard errors and the ECC method may correct a soft error in the group only during its transmission to the requestor. However, an ECC corrected soft error could be corrected in MS by storing the corrected DU+ECC group in its original location, which is sometimes called "scrubbing" the data.

SUMMARY OF THE INVENTION

This invention makes the use of the C/R method more reliable and efficient, and less disrupting of system operations compared to prior use of the C/R method. This invention eliminates processor interruption upon the invocation and correct operation of the C/R method to significantly improve the efficiency of system performance when the memory technology has a significant number of excessive error conditions. And this invention augments the C/R method facilitating its ability to retry its operation and by providing for the monitoring and reporting of the correction of excessive errors to reduce the need for system interruptions. This invention can reduce the amount of communications to a single excessive-error communication per memory page frame (or any other unit of memory reporting) even though excessive errors occur many times in a memory unit. The monitoring by this invention greatly reduces the involvement of both the operating system software and of a system service processor in C/R error corrections.

An object of this invention is to provide means in which the C/R process is done dynamically by a requesting processor and a memory controller so that intervention by a service processor is reduced or eliminated.

Another object of this invention is to allow C/R correction of a data unit without suspension of data processing by the requesting processor.

A further object of the invention is to make the hardware implementing the C/R method tolerant of some of the failures that can enable the method to correct an error when it otherwise may not have been corrected.

The invention significantly increases the value of the C/R method by providing it with retryability, which requires that no matter where failure occurs during execution of the C/R process, the original erroneous DU+ECC value existing prior to the start of the C/R method be restored in its original location, so that the C/R method can be retried. Failure-free recovery is essential to obtaining reliability in the use of the C/R method.

The invention automatically invokes the C/R method when the ECC method detects an excessive error (e.g. two erroneous bits in a data unit when the C/R method is used with SEC/DED type ECC). Then this invention uses the ECC error detection in combination with the C/R method to detect the different cases of double error combinations, which are the H-H, H-S and S-S cases. The detection of the H-H case reveals that two hard errors exist in a data unit in memory, which presents a failing condition for memory. The detection of the H-S case reveals that one hard error exists in a data unit in memory, which also presents a failing condition for memory. But the detection of the S-S case reveals two soft errors exists in a data unit in memory, which does not present a failing condition for memory but presents an uncorrectable error condition for a data unit stored in memory.

The invention can use the C/R method with other ECC methods instead of SEC/DED, such as with double error correction/triple error detection (DEC/TED), or with triple error correction/quadruple error detection (TEC/QED), etc. The replacement of SEC/DED with any of these other known ECC types correspondingly increases the number of soft correctable errors in a data unit. For example, replacement of the SEC/DED ECC with the DEC/TED type of ECC allows up to two soft errors to be corrected per data unit, which would handle the H-H-H, H-H-S, H-S-S and S-S-S cases. Or replacement of the SEC/DED ECC with the TEC/QED type of ECC allows up to three soft errors to be corrected per data unit, which would handle the H-H-H-H, H-H-H-S, H-H-S-S, H-S-S-S and S-S-S-S cases, and so on for higher order ECC types. The location of the error bits in a data unit is not important in this invention.

This invention enables different types of remedial actions to be used for these different detectable cases by enabling records to be maintained in the system by signalling the occurrence of the particular error case in an automatic manner that can be recorded by the system for later maintenance use.

The invention may prevent an emergency maintenance situation that may shut down a system by enabling the system reporting of errors to detect between excessive hard and soft errors. A unique reporting process enables later non-emergency maintenance to handle conditions causing the detected errors.

This invention increases the fault tolerance of a system in the manner of use of the combined C/R and ECC methods by having redundant status control registers and using comparisons and parity checking for them.

An example of the report signalling by this invention is where the CPU maintains a memory map in main memory of all 4KB page frames in system main storage (MS). The memory map is called a Logical Track Record (LTR). The requesting processor reports to the LTR the H-H, H-S and S-S excessive error cases for the respectively addressed memory unit (4KB page frame) if the excessive error type has not previously been reported for the respectively addressed memory unit, significantly reducing the number of processor interruptions for reporting that delay its processing and reduces system efficiency.

The LTR also is reported to a system service processor (SP) to enable the SP to maintain its own page frame map called Physical Track Record (PTR) in a persistent disk file. The PTR is retained after the LTR is lost by a reset of the volatile CPU memory. Upon the next reinitialization of the CPU, the SP uses the PTR to rebuild the LTR in memory for the CPU software so the CPU need not waste time rebuilding the LTR by repeating error interruptions for bad pages that had previously been reported as error conditions. The PTR has a threshold of an amount of error conditions after which the appropriate part of the system can be fenced off and shut down for convenient maintenance.

DESCRIPTION OF THE PREFERRED EMBODIMENT

Figure 1:
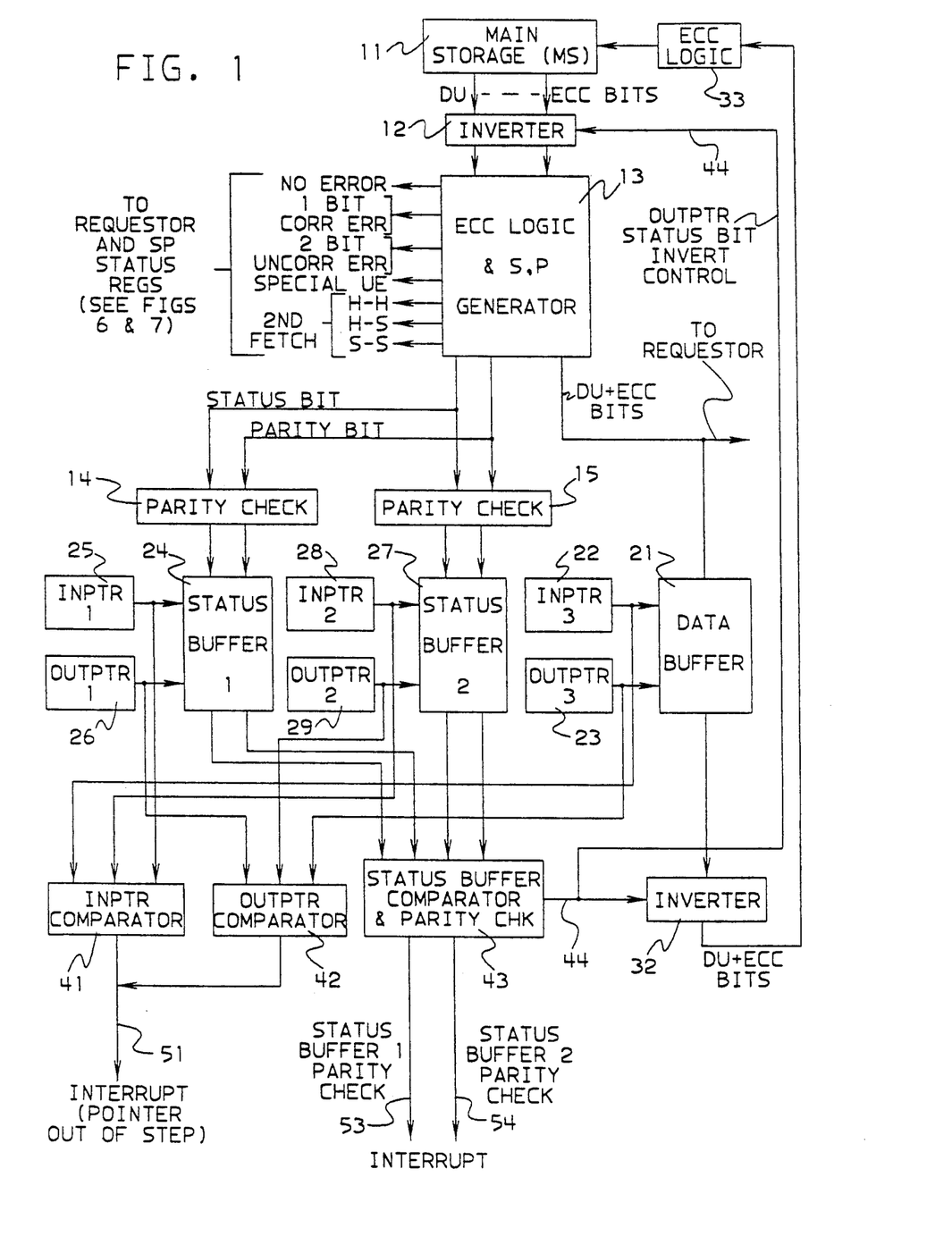
FIG. 1 illustrates the interacting collection of hardware used by the preferred embodiment to improve the fault tolerance of the C/R method.
Figure 2:
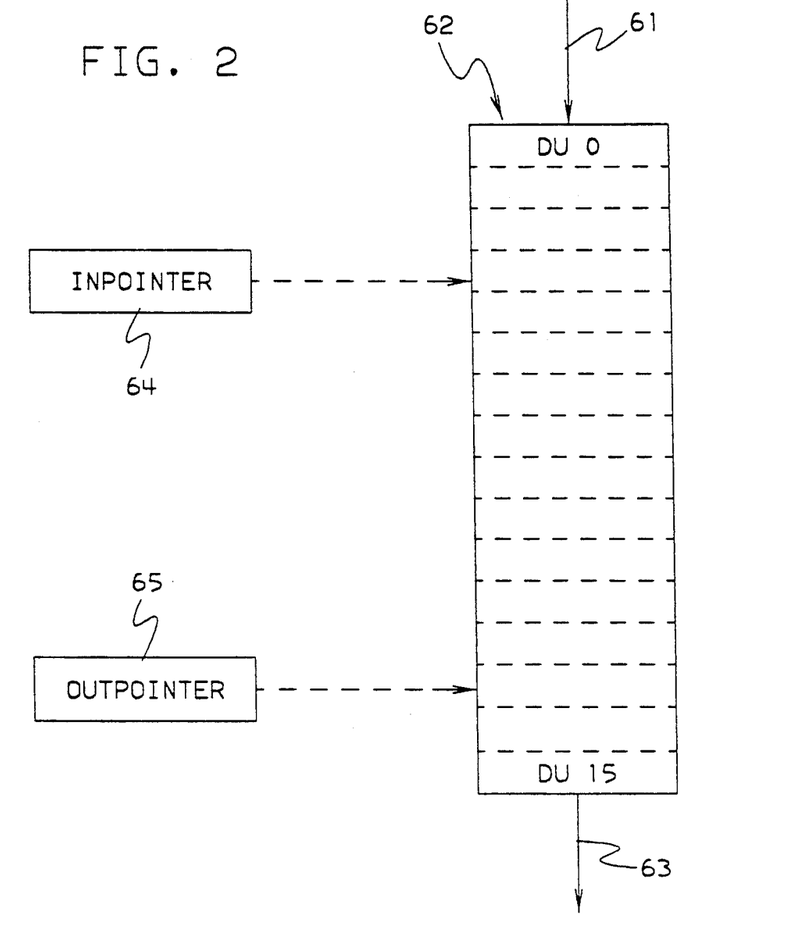
FIG. 2 illustrates the structure of the data buffer with its inpointer and outpointer.
Figure 3:
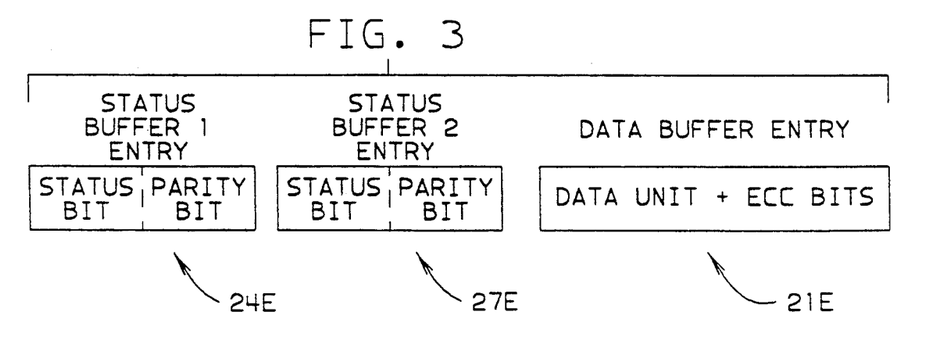
FIG. 3 illustrates respective contents of the three buffers accessed at corresponding locations of their inpointers or outpointers.

FIG. 1 provides hardware that obtains novel control of the C/R method for correcting erroneous data requested from main storage (MS) 11 by a requestor, which may be a CPU (central processing unit), an I/0 processor that is controlling one or more I/0 devices, or a service processor (SP). Each request for data sends an address to MS for accessing a line of data in MS DRAM arrays comprising a memory in a computer system. The invention may be applied to any memory, but the preferred embodiment uses the main storage (MS) in a computer system. Each request provides the MS address of a requested data line in MS and the requestor's identifier (RID), which is provided to the memory controller.

Each data line in MS 11 contains one or more data units (DUs), of which each data unit is a group of data bits over which an error correcting code (ECC) is generated to provide a total group of bits indicated by the notation DU+ECC group. The ECC bits in a group are commingled among the DU bits, and the ECC bits enable SEC/DED for its group during its readout and transmission.

In the preferred embodiment each data line is comprised of sixteen DU+ECC groups. The bits in a DU+ECC group are readout and transmitted in parallel on a memory bus in the preferred embodiment, but they may be serially transmitted on a bus for the current data line. Also, the preferred embodiment presumes each DU is a double word of 64 data bits having 8 ECC bits providing SEC/DED. Hence, the 64+8=72 bits are transferred on the bus in parallel. If a serial bus were used, each DU+ECC group would be assembled/disassembled into its parallel bit form to and from memory.

Figure 8:
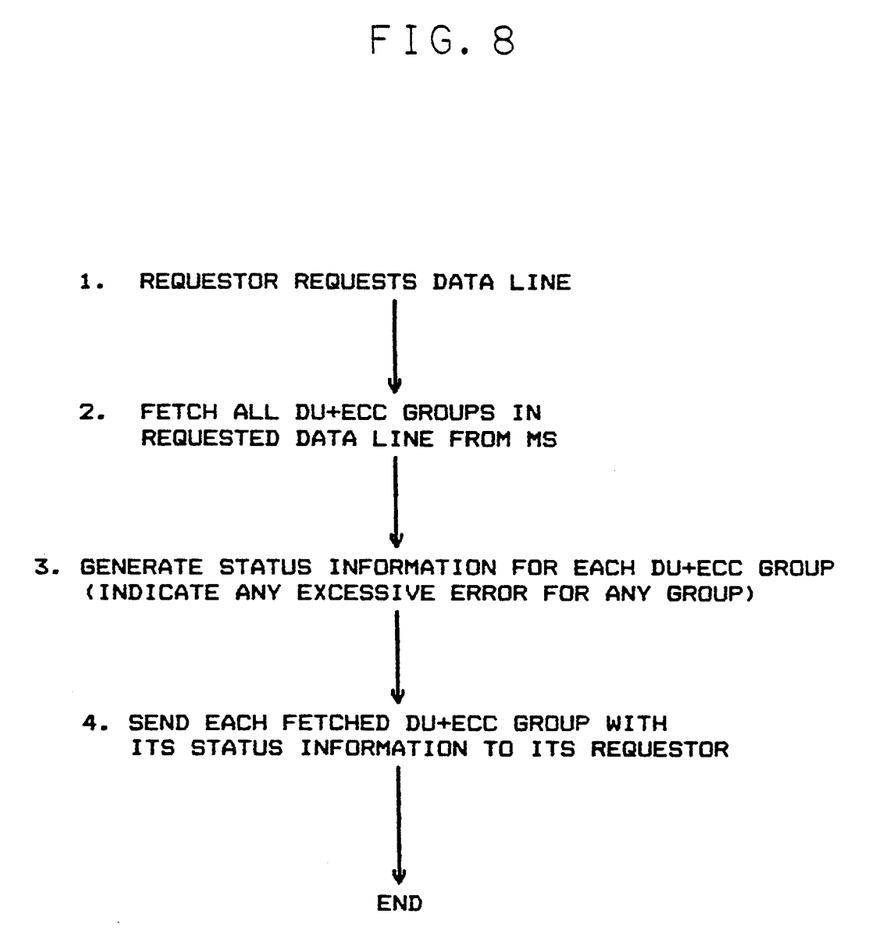
FIG. 8 is a flow diagram showing the fetch error detection process.

Original Fetch Request (FIG. 8 Process)

In the hardware of FIG. 1, each of the 16 DU+ECC groups in a requested data line is transferred from MS 11 through inverter circuits 12 to an ECC logic circuit 13. During an original fetch, each group passes through inverter 12 in its true (non-inverted) form to ECC logic circuit 13. Circuit 13 error checks each DU+ECC group and passes it to its requestor, whether the ECC logic found it error-free or not. If a DU+ECC group has only one erroneous bit, it is error corrected before being sent to the requestor. Status information is sent with the data to the requestor to inform the requestor of the group's error-free or particular error condition.

If the requestor receives error-free data (whether or not ECC corrected), the C/R function is bypassed (not done for the request). A particular status signal identifies any detected error condition to the requestor for the sent DU+ECC group, so that the requestor can determine what it wants done with the request, including whether the requestor will request the C/R method to be performed on the erroneous DU+ECC group.

The flow diagram of FIG. 8 shows the steps in an original fetch operation for a data line request, in which step 1 represents the current request. Step 2 represents when the fetch request obtains priority from the memory controller, which involves putting the request into memory request register 71 in FIG. 4, from which addresses are generated for each DU+ECC group in MS. Step 3 is the generation of status information which is put into registers 73 and 74 in FIGS. 6 and 7, which are located in the memory controller for MS 11.

Figure 6:
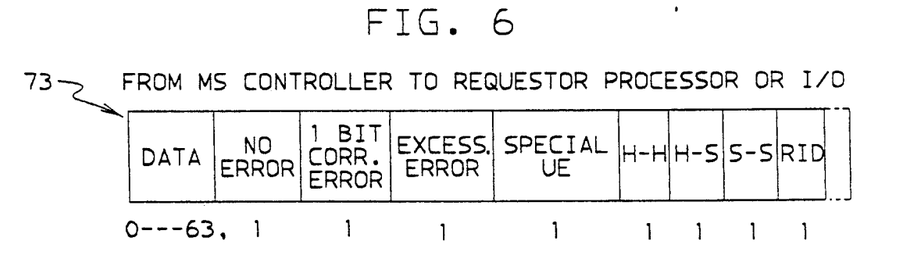
FIG. 6 shows a status request register in an MS controller used to indicate to the operating system software the status of a current fetch request.

Register 73 in FIG. 6 represents the status information sent to the requestor and has the following fields set by ECC circuits 13: a requestor identifier (RID) of the processor which made the request, the 72 bits of the fetched DU+ECC group, and the following single bit indicator fields: no error, 1 bit corrected error, excessive error, and a special UE (uncorrected error) indicator. The special UE is a unique character stored in a memory location to represent that the location had bad unrecoverable data due to an error.

Figure 7:
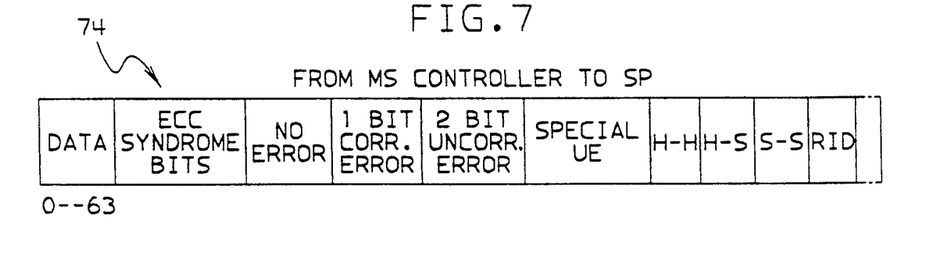
FIG. 7 shows a status request register in the MS controller used to indicate to the system service processor (SP) the status of a current fetch request.

Register 74 in FIG. 7 represents the status information sent to a service processor (SP) which is also set by ECC circuits 13 with the same information as is put into register 73, except that register 74 also has a field set with the ECC syndrome bits for the group. By providing the syndrome bits to the SP, the SP has the option of using the syndrome bits and other status information to verify the ECC operation, if required. For an original fetch, the fields H-H, H-S and S-S in registers 73 and 74 are not generated (remain off in reset state) in the status registers.

Figure 4:
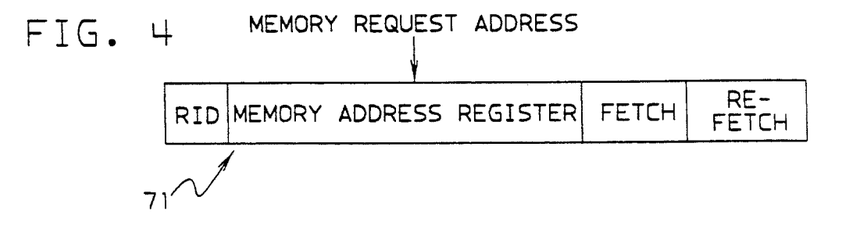
FIG. 4 represents a memory request register used for receiving requests from CPUs, I/Os and other requestors requesting a complement/recomplement (C/R) error correction operation.

In step 4 of FIG. 8, the status information in register 73 is communicated to the requestor indicated in the RID field, which is the fetch request currently represented in register 71 in FIG. 4.

Figure 9:
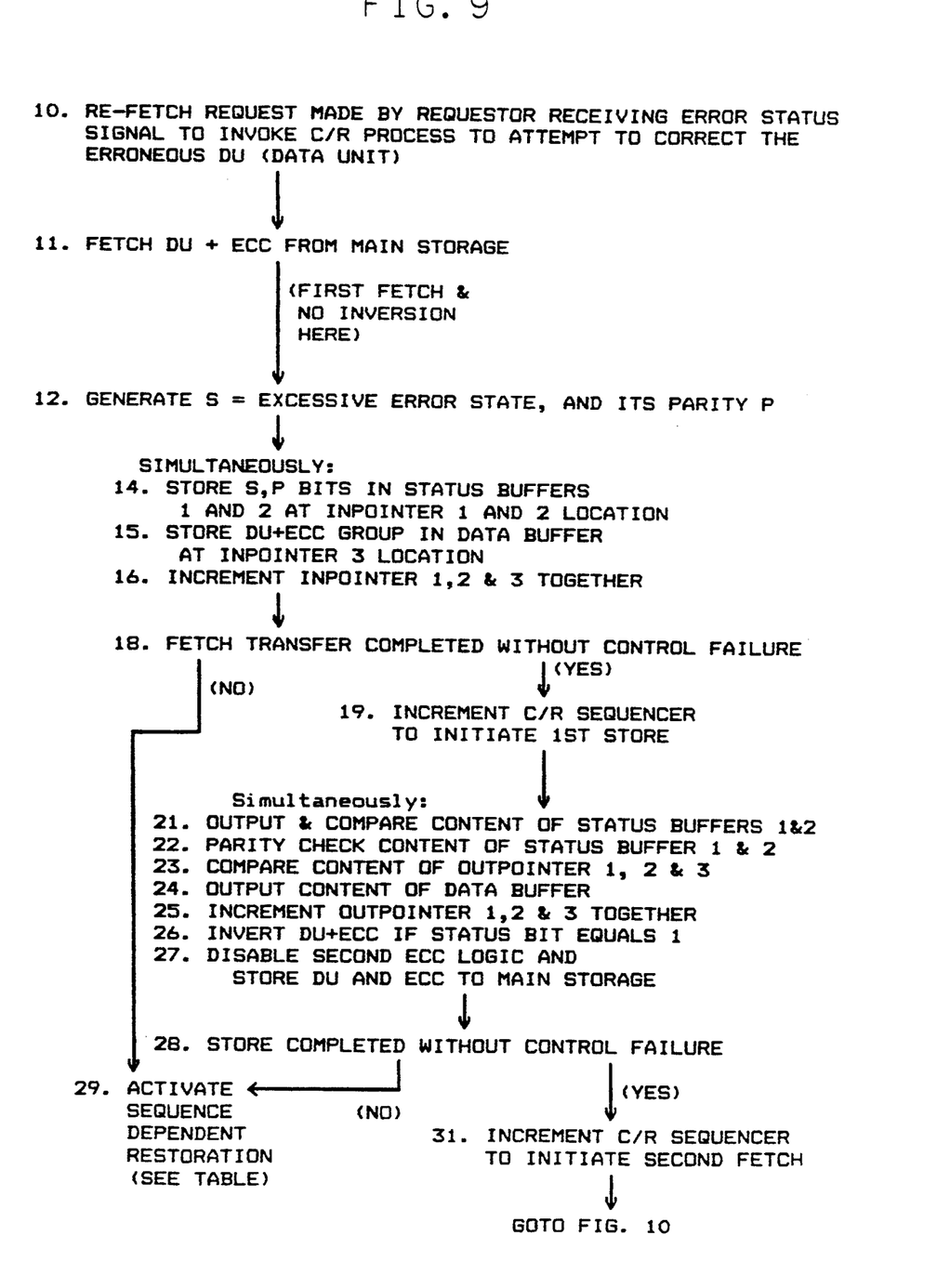
FIG. 9 and FIG. 10 are flow diagrams showing the C/R process invoked by a refetch request from a requestor responding to a double-bit error status signal sent to the requestor by the MS controller.

Re-fetch Request (See Process in FIG. 9)

The requestor may be a CPU, an I/O processor, or a service processor. Each requestor has hardware for receiving and sensing the received status information and determining if further action is needed for continuing the storage request with the C/R method if an excessive error is reported in the status register information. In the preferred embodiment, if the requestor receives an excessive error indication in the status register, the requestor automatically makes a re-fetch request to MS, which is a request for invoking the C/R method to attempt a correction of the excessive error in that DU+ECC group.

Status register 74 in FIG. 7 has its contents transmitted to a service processor (SP) such as exists in the processor control element (PCE) of an IBM 3090 system. The SP controls the error recovery operations for the system when required for an MS error condition, such as if an unrecoverable failure occurs in the hardware handling the request. For example if an error condition occurs in handling of the DU+ECC group, the SP may cause a special UE character to be written into the location containing the erroneous group to prevent the bad data from being used.

If a requestor (receiving the status register information for an original fetch request) finds the no error field is on, no response is provided and the requestor uses the received group. But if the excessive error indication is received, a re-fetch request (sometimes called a redo request) is the response provided to the MS controller by the requestor's hardware/microcode. The re-fetch request invokes the C/R hardware in FIG. 1 in an attempt to correct the erroneous DU (currently being addressed by register 71).

No interruption is caused to the normal operation of MS 11 or to the requesting processor during the process of issuing a re-fetch request invoking the C/R method.

The successful use of the C/R process without an interruption to the requesting processor provides significant novelty for the subject invention over the prior art. Previously, an interruption to the requesting processor always occurred on sensing an excessive error condition (2 bit error with SEC/DED ECC) during which the SP was invoked to initiate and control the execution of the C/R method. A significant amount of processor time was lost in that prior process compared to the process of the subject invention.

The following TABLE represents the four states of the C/R sequencer shown in FIG. 4 and some of their consequences including the restoration actions needed for restoring an erroneous DU+ECC group to its original state in MS if a failure should occur in the C/R hardware before its completion of the C/R process.

TABLE

| State | Action during State | DU+ECC Form in Data Buf At End of State | DU+ECC Form in MS At End of State | DU+ECC Restoration For Retry (Assures DU+ECC in Original State) |
|---|---|---|---|---|
| First Fetch | MS to Data Buf | True | True | None |
| First Store | Data Buf to MS | True | Inverted | Data Buffer to Main Store (Without Comp.) |
| Second Fetch | MS to inverter to Data Buf | True | Inverted | If Status Buffer Error is recoverable, redo this second fetch, then do second store |
| Second Store | Data Buf to MS | True | True | Redo Second Store |

Figure 5:
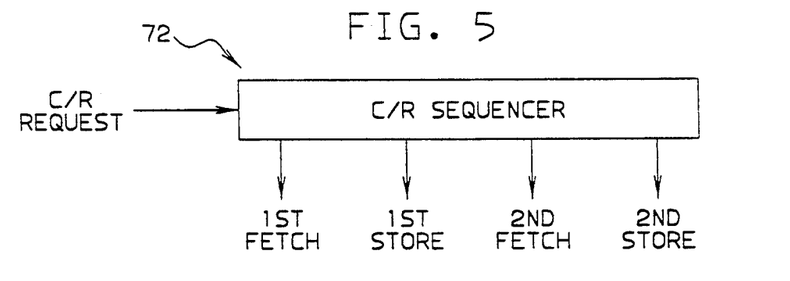
FIG. 5 represents a C/R sequencer used to control the steps in the C/R operations used by shown hardware in FIG. 1.

Thus, the first fetch state of the C/R method is provided in response to a re-fetch request being handled by the memory controller, providing a C/R request from the requestor to sequencer 72 in FIG. 5. Normally, the four states of the C/R method proceed in sequence and complete with the second store state, as long as the hardware used by the C/R method operates correctly.

If a malfunction signal occurs during any state of the C/R method (indicated by the output state signal of sequencer 72), the malfunction signal causes a suppression of any further steps in the C/R process and invokes a restoration operation to assure the restoration of the DU+ECC group being processed to its original state in MS. This is because the DU+ECC group may be stored in a complemented (inverted) form in its original MS location at the end of the 1st store and 2nd fetch states of the C/R process. The particular data restoration action depends on which step of the C/R process existed when suspension occurred. Then the restored erroneous DU+ECC group enables it to be retried again to a potential corrected state. Without restoration, a retry of the C/R method may not be able to correct the erroneous DU+ECC group, and would prohibit confidence in the correction ability of the C/R method.

Figure 10:
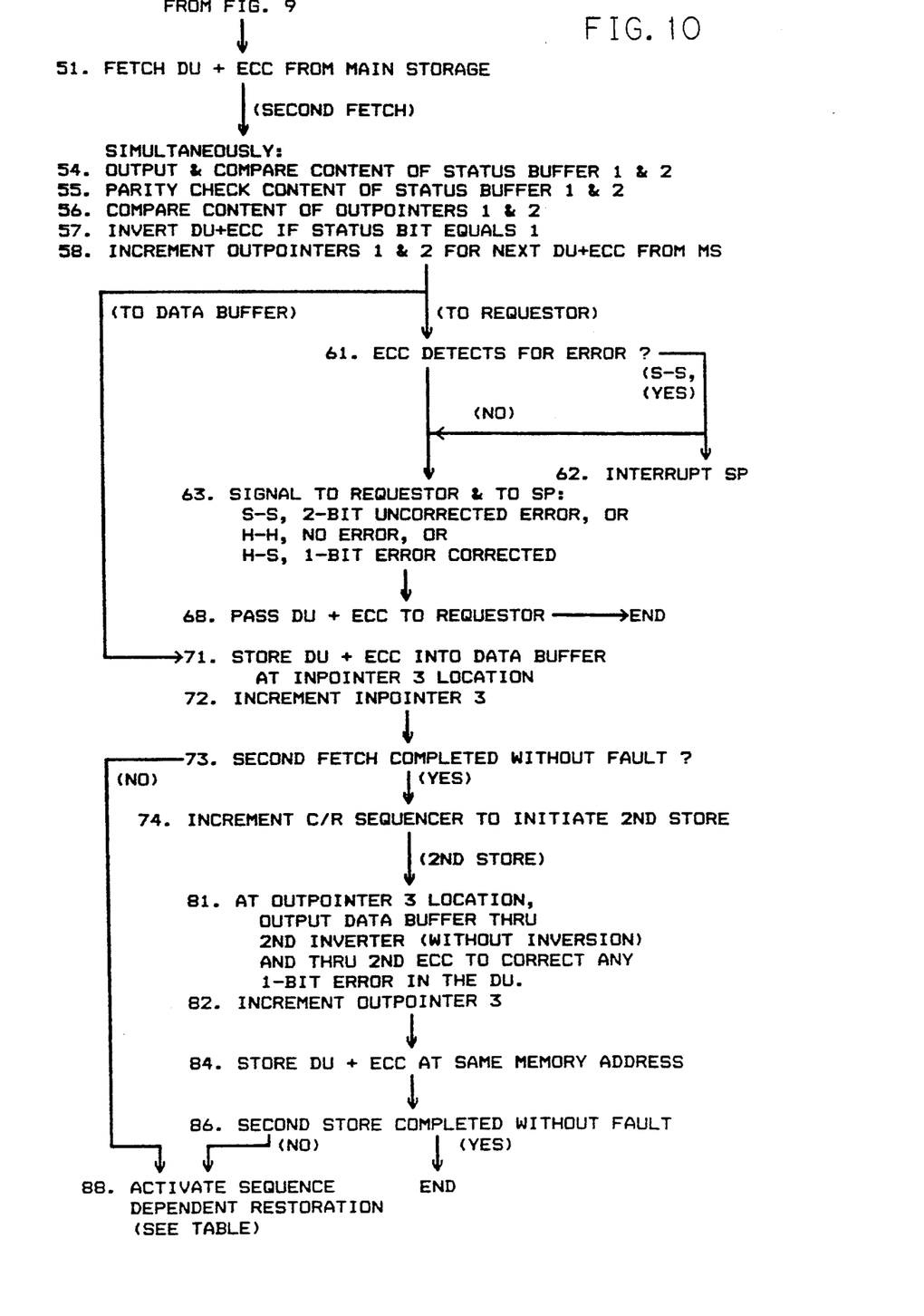

FIGS. 9 and 10 show detailed flow diagrams of the C/R method used in the preferred embodiment, and represent the C/R steps in the TABLE in more detailed substeps.

Step 10 in FIG. 9 represents a re-fetch request selected by the MS controller for accessing in register 71, wherein requests are prioritized and may be pipeline delayed before becoming the current MS request in address register 71. Hence, many machine cycles may intervene between the time a fetch or re-fetch request is issued and the time its is performed by MS 11, due to conventional priority selection being done for MS operations. That is, other fetch and store requests to MS 11 may be serviced during this intervening period. Refetch requests usually get higher priority than fetch requests in the memory controller.

Step 10 in FIG. 9 represents a re-fetch request being put into register 71 for activating the input "C/R request from requestor" to the C/R sequencer 72 in FIG. 5 is set it to its 1st fetch output state.

Step 11 in FIG. 9 represents the fetching of each DU+ECC group from MS.

Step 12 represents the generation by circuits 13 of a "status bit", S, and a parity bit, P, for each DU+ECC group. Bit S is generated as a copy of the "excessive error bit" field in the received status register information for the current DU+ECC group. The status bit has a zero state if no excessive error is indicated, but it has a one state if an excessive error is indicated. And circuits 13 generate a parity bit, P, for each status bit. The parity bit may be generated with either even or odd parity. Odd parity is used in the preferred embodiment. Therefore, when the status bit is 1, the parity bit is zero, and visa versa, in the embodiment.

In step 14 the status bit and its parity bit (S,P) generated for each DU+ECC group are copied into S and P fields in an inpointer addressed entry in each of two separate status buffers (status buffer1 and status buffer2). The corresponding entries in buffers 1 and 2 receive identical status bit and parity bit states. The inpointers for the data buffer 21 and for the status buffers 1 and 2 all address corresponding entries in their respective buffers and all are incremented at the same time during the first fetch operation.

The C/R method is only invoked if a status bit, S, is set to a 1 state (to indicate an excessive error) for at least one DU+ECC group of the 16 DU+ECC groups in the current MS data line being read into the data buffer. Generally, most of the DU+ECC groups in the data buffer will not be erroneous and their respective S bits will be set to zero state to indicate no error in the corresponding DU+ECC group stored in data buffer.

A 1 value of the S bit for any DU+ECC group controls both inversions for the bits in that group in the C/R hardware of FIG. 1. Thus a 0 value for the status bit (indicating no error) does not cause any inversion (complementing) of the group as it moves though the hardware in FIG. 1. See step 26.

Step 15 represents the storing of each DU+ECC group in data buffer 21 at the inpointer location. In step 16, the inpointer is incremented and the next DU+ECC group is read from MS into the next entry in data buffer 21, until all 16 groups are written into the data buffer for the data line currently being addressed by the memory address register 71 in FIG. 4.

Step 18 tests if any error has been detected in the C/R processing hardware, and if an error is detected, the C/R process is suppressed and the DU+ECC group in MS is restored to its original state existing before the start of the suppressed C/R processing.

If step 18 finds no operational error, the C/R processing continues with step 19 incrementing the C/R state sequencer to its 1st store output state.

In FIG. 1 outpointers 3, 2 and 1 are provided for the data buffer 21 and the two status buffers 2 and 1 to control the selection of the corresponding entries being outputted. During the 1st store state, the outpointers are incremented at the same time by step 25 to all have the same address in order to point to their corresponding entries in their respective stacks. Steps 21, 22 and 23 perform check operations on these pointers and on the contents of their accessed entries to detect any hardware error that might have occurred.

Initially, the inpointers and the outpointers address the first DU+ECC group in the data buffer (and its respective status buffer entries) of the current data line. As soon as plural DU+ECC groups are stored in plural entries in the data buffer (along with their corresponding status and parity bits in corresponding entries in the status buffers 1 and 2), the inpointers will increment ahead of the outpointers, and the outpointer addressed entries can be outputted from the respective buffers as long as the inpointer value is ahead of the outpointer value.

The outpointer addressed DU+ECC group is outputted from the outpointer data stack entry to an inverter 32 in FIG. 1. The corresponding outputted value of the S bit from either status buffer 1 or 2 (they are the same as long as they are not in error) is used to control all inversion operations in FIG. 1 upon the DU+ECC group being outputted under the outpointer control. The value of the outputted S bit is registered in circuits 43 for the duration of the current C/R processing. If the registered S bit has a 1 value, it activates an inversion control signal on lines 44 to inverter 32 and inverter 12 (which causes an inversion of the DU+ECC bits on the first store and on the second fetch). If the S bit is 0 for the currently outputted DU+ECC group, no inversion is done for the respective DU+ECC.

Step 26 cause an inversion (complementing) of the current outpointer group in inverter 32 if a 1 state exists for corresponding S bit. Then step 27 disables and passes the DU+ECC group through ECC logic circuits 33 and stores the group into the same MS location from which it was fetched. Inverter 32 does not invert the DU+ECC group if the corresponding S bit is 0. ECC logic 33 does not operate on the group during the 1st store operation.

The outpointer incrementing will control the storing of all DU+ECC groups into the data line in MS, in which only the group(s) having an excessive error (S=1) are in inverted form in MS upon the completion of the first storing step of the C/R method.

Step 28 checks if the stores occurred without any failure in the hardware of the C/R processing for the 1st store operations. If a failure is detected, step 29 is entered for activate the restoration required for a failure during the 1st store state of the C/R processing, indicated in the above TABLE.

If the 1st store is found to have completed successfully, step 31 is executed to increment the C/R sequencer 71 to its 2nd- fetch state to initiate the 2nd fetch of the data line now stored in MS with one or more of its DU+ECC groups being in complemented form.

Second Fetch in C/R processing (FIG. 10)

In the second fetch, the inpointer 3 operates the same as it did in the 1st fetch operations to access each DU+ECC group in the data line being addressed by register 71. Inpointers 1 and 2 are not used in the second fetch operation. Thus, step 51 accesses each DU+ECC group in the current data line being addressed by register 71.

Steps 54, 55 and 56 perform check operations for the C/R hardware, which are discussed later.

In the second fetch, the outpointers 1 and 2 operate differently from the first fetch, and instead address the status buffer entries having the S bit corresponding to the current DU+ECC group being read from MS into the data buffer at the inpointer 3 location. In the second fetch, the outpointers 1 and 2 step together with inpointer 3, although the incrementing of inpointer 3 may occur a cycle or two later when there are corresponding buffering delays in the ECC circuits 13.

Outpointer 3, on the other hand, controls the 2nd store operation for DU+ECC groups in the data buffer earlier obtained by the 2nd fetch operation, so that the 2nd store operation can overlap the 2nd fetch operation.

The outpointers 1 and 2 address the status buffer entries 1 and 2 to access the S bit for each DU+ECC group being read from MS, in order to control the operation of inverter 12 while the respective group is passing through inverter 12 to execute step 57 in FIG. 10. The outpointers 1 and 2 are initially set to address the first DU+ECC group to be readout to control the required inversion state of inverter 12. Then outpointers 1 and 2 are incremented for the next DU+ECC group to be readout, etc.

Each accessed S bit in the status buffers (which was generated during the first fetch) is used again without change during the second fetch to control the second inversion of each erroneous DU+ECC group to obtain correction of all hard errors in the group during the second fetch operation.

Thus, the order of the S bits in each status buffer is the order of the respective DU+ECC groups readout of the data line put in MS by the 1 st store operation.

Step 58 in FIG. 10 increments outpointers 1 and 2 just prior to each next DU+ECC group being fetched in MS, so that the corresponding S bit is effective to control inverter 12 operation for the group being read from MS.

In FIG. 10, the paths from step 58 to step 61, and from step 58 to step 71 are simultaneously taken. In the first path, the SEC/DED ECC circuits 13 detect for error conditions remaining in the current DU+ECC group AFTER the second inversion in the C/R method has corrected all existing hard errors. Step 61 determines for the current group: 1) if an H-H condition exists because the ECC did not correct any error, or 2) if an H-S condition exists because the ECC corrected 1 error, or 3) if an S-S uncorrectable condition exists because the ECC could not corrected the existing error condition. Step 63 sets the corresponding 1 bit field in registers 73 and 74, which are required for use by the system error reporting process in FIG. 11. Then, step 68 sends the status register contents to the requestor and to the SP, which includes sending to the requestor all 16 data units comprising the fetched data line.

The parallel path continues with step 71 storing the current DU+ECC group in the data buffer at the current inpointer 3 location, and then pointer 3 is incremented by step 72.

Next step 73 tests whether the second fetch has completed without an error condition is the C/R hardware processing, which is a different type of error condition from the error conditions detected in the DU+ECC group by step 61. If a C/R processing error occurred, step 88 is entered to restore the current DU+ECC group in MS for conditions existing at the end of the 2nd fetch. If no C/R processing error occurred, step 74 increments the C/R sequencer 72 to its last state, 2nd store.

Second Store of C/R Processing (FIG. 10)

Each group was written into the data buffer in its true state, since erroneous group(s) now has been double inverted and non-erroneous DU+ECC groups were never inverted. Then step 81 write each group into MS from the outpointer 3 location in the data buffer without any inversion.

Outpointer 3 (unlike outpointers 1 and 2) operates in the same manner as it did for the first store in the C/R method, in which outpointer 3 is initially reset to the first entry in the data buffer, and is incremented after each DU+ECC group is outputted from the entry. However, no S bit control is used in the 2nd store operation, so that there is no need for any S bit alignment with the data buffer entries as there was during the 1st store operation. And therefore none of the other pointers operates in synchronously with outpointer 3. Step 82 increments outpointer 3 after each group is outputted.

Accordingly, during the 2nd store operation, the entire data line exists in its true and original state in the data buffer, and after the 2nd store operation is completed, all groups in the data line remain in their true and original state in MS, except that any group only having a single soft error can be corrected by scrubbing. Hence, the groups in MS will still have all hard errors, and all soft errors when more than one soft error existed in a group.

Accordingly, the C/R error correction process is completed, if no error occurred in the C/R processing hardware.

Hardware Error Detection

To achieve a high degree of confidence in the fault-tolerance of the C/R hardware, novel means are provided to detect a failure in the operation of the C/R hardware.

It is possible for an alpha particle to cause a soft error in any bit in any buffer entry, and in any pointer register. Also it is possible to have a hard error in these same bit positions.

A number of error checks are made in this embodiment while it is in operation to increase the fault tolerance of the C/R method.

The status buffers and the data buffer each have an inpointer and an outpointer for use during writing and reading respectively. There are times when all inpointers must step in unison (during the first fetch) and all outpointers must step in unison (during the first store). At other times, only the two inpointers of the status buffers must step in unison (during the second fetch when the outpointer of the data buffer is not in use), and the two outpointers of the status buffers must step in unison. When one of the pointers is out of step, an attempt is made to recover the originally stored state of the DU+ECC group and a retry of the C/R operation is made.

The values of inpointers 1 and 2 are always supposed to be the same, which is check by comparator 41. Likewise the values of outpointers 1 and 2 are always supposed to be the same, and they are checked by comparator 42. If comparator 41 or 42 ever finds an unequal condition, an error is detected, and the comparator then outputs an interruption signal to the requesting processor and to the SP. Also the current erroneous DU-+ECC group is restored as indicated in the above TABLE so the C/R method can be retried on that group.

If the inpointers are out of step during the first fetch, there is no damage to the data in Main Storage. Therefore, it is simply a matter of sending an interruption signal to the requestor for it to request a retry of the C/R method from its beginning.

If the outpointers are out of step during the first store, an interruption signal will be generated to abort the first store to preserve the data in Main Storage. Then the C/R method is retried in its entirety.

If the outpointers of the two status buffers are out of step during the second fetch, an interruption signal is generated to abort the second fetch. Since the reading of the status buffers and MS are non-destructive reads, the content of MS and the status buffers are assumed to be un-changed. Therefore, recovery is possible by a retry of the second fetch or second store C/R sequence.

When these out-of-step interruptions frequently occur within a given time interval, the hardware involved in the C/R method is assumed to be unreliable and must be replaced immediately.

On each access to the status buffers 24 and 27 by their inpointers and by their outpointers, the accessed status and parity bits (S,P) are suppose to be the same, and they are also compared for equality in a comparator in circuits 43. If the compared S,P values are ever different, an error is indicated and an interruption signal is sent to the requesting processor and to the SP.

Also circuits 43 do a parity-check of the S,P content of each accessed status buffer entry for detecting any parity error condition. If the parity check is bad in one of the status buffer entries, the S bit in the other corresponding status buffer entry is used for the inversion control explained above if its parity is correct.

The redundancy of the status buffer allows the C/R operation to proceed in case the accessed entry of one status buffer has a parity error and the accessed entry of the other status buffer has good parity. However, when parity errors are detected in the accessed entries of both status buffers, the C/R operation must be halted as soon as possible and an interrupt is sent to the SP for assistance. If this interrupt occurs during the first store, the store operation is aborted immediately to preserve the original data in MS. At this point, the content of the status buffers and data buffers can be reloaded by re-executing the C/R operation in its entirety. If this interrupt occurs during the second fetch, the C/R operation suffers an unrecoverable failure because the status bits cannot indicate, due to parity errors, whether the DU-+ECC in MS has been complemented or not. As a result, a special UE character will be stored in MS at the address involved with the C/R operation to indicate a bad, unrecoverable block of data.

Before storing the status bits, each status buffers checks the status bits for good parity. The status bits that have a bad parity will be written into the status buffer with a default value of '0' and its parity of '1'. This action is taken to ensure that all entries in the Status Buffers have good parity at the end of the First Fetch. The default S bit does not cause any inversion and prevents the C/R method from operating on that group.

In more detail during the first fetch, the outpointers 1, 2 and 3 are compared to ensure that the outpointers always step in unison. Any discrepancy among the outpointers will cause an error signal to be generated noting failure of operation. However during the second fetch, only the outpointers 1 and 2 of the two status buffers are compared since they do not step in unison with outpointer 3. This is done in FIG. 9 by steps 21, 22 and 23, and in FIG. 10 by steps 54, 55 and 56.

The completed results of the C/R method are passed to the requestor as corrected data or as uncorrected data (such as the detection of two soft errors, or of a special UE).

Figure 11:
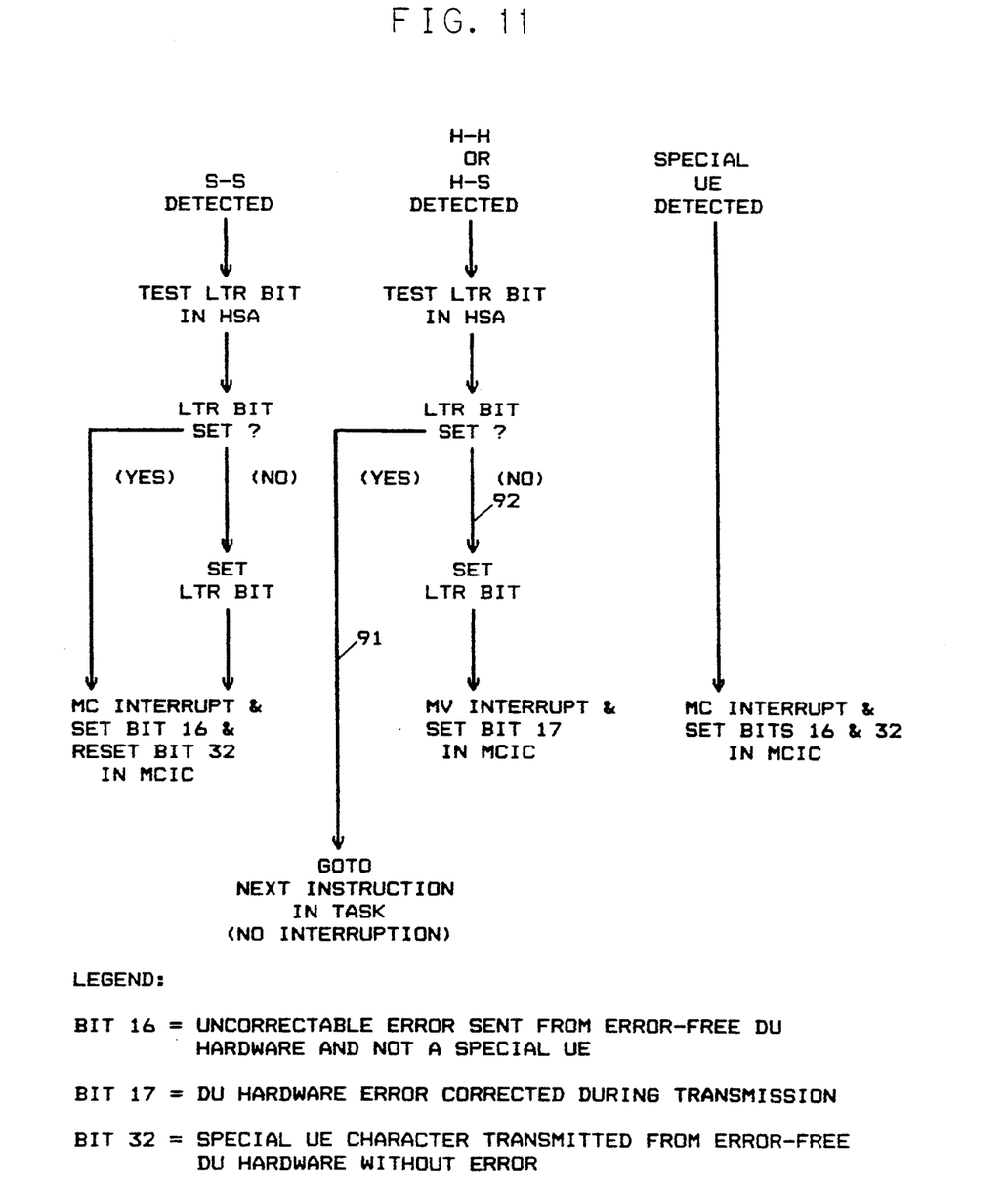
FIG. 11 is a flow diagram of a process of signalling to a service processor from the described C/R process, and the system use of the various signals provided by the C/R method.

Reporting Reduction for Excessive Errors (FIG. 11)

The reporting process in FIG. 11 greatly reduces the amount and frequency of reporting excessive errors to operating system software (OS), and eliminates all interruptions for a hard error in a memory unit, e.g. a 4 KB page, that was previously reported.

The reporting process in FIG. 11 is invoked when the requestor receives status information (shown in FIG. 6) indicating an excessive error exists in the requested data line.

This embodiment provides a novel table called an LTR (logical track record), which is located in a storage area only accessible to microcode. The LTR includes a set of reporting bits, one for each MS data unit (e.g. 4KB page).

Microcode in the requesting processor accesses the LTR to determine if reporting is needed for the currently detected excessive error condition provided by status information after the second fetch in the C/R method.

Three different monitoring processes are represented in FIG. 11, and their selection is dependent on which type of excessive error is being reported, which can be any one of the S-S, H-H, H-S and special UE cases, which represent different cases of hard and soft error detection by the C/R method.

The H-H and H-S cases each indicate the addressed page is stored in bad MS hardware. Then a bit in the LTR is accessed using the page address of the data line having the currently detected excessive error. If the accessed LTR bit is set on, the yes path 91 is taken which indicates an excessive error was previously reported for that page, and that no communication with OS is needed for the currently detected excessive error, so that no processor interruption is generated. But if no error has been reported for this page, then the no path is taken which sets the LTR bit and causes an MC interruption that sets bit 17 in the machine check interrupt code (MCIC) to communicate to OS the first excessive hard error in the page.

The S-S case does not indicate any bad hardware in the addressed page, but that soft errors were detected in it. Soft errors indicate bad data (which may be in good hardware). An excessive soft error must be reported each time it occurs, which is done by causing a machine check interruption that sets bit 16 and resets bit 32 in the MCIC to communicate the soft error to OS.

If the LTR bit is set on in the S-S path and later a hard error is detected in the same page causing an entry into the H-H or H-S path in FIG. 11, the LTR bit for that page will have been set on so that path 91 is taken which avoids any interruption to the requesting processor due to the C/R processing.

Thus, when the process on path 91 in FIG. 11 is taken, it eliminates the two clock-stopping interruptions (to the processor and to the memory) which occurred in the prior art operation of the C/R method. The first interruption occurred on the invocation of the C/R method, and the second interruption occurred on the determination of the type of excessive error being detected. This invention eliminates the first type of interruption and greatly reduces the second type of interruption.

The special UE (uncorrectable error character) indicates that bad data was put into its location, which was stored as a special UE data pattern. The special UE (when fetched) causes a machine check interruption which sets bits 16 and 32 in the MCIC to communicate the special UE to OS.

Although the preferred embodiment is disclosed in connection with the main storage, it is understood the present invention may be used with other storages such as expanded storage or key storage and by other requestors such as vector processors.

Where we have illustrated and described the preferred embodiment of our invention, it is to be understood that we do not limit ourselves to the precise construction herein disclosed, and the right is reserved to all changes and modifications coming within the scope of the invention as defined in the appended claim.

We claim:

1. A method for handling storage errors, the method comprising the steps of:

fetch requesting by a processor of data from a memory in a data processing system, and responding by a memory controller with the data and indicating any excessive error in the data detected with ECC bits;

refetch requesting by the processor of the data in response to receiving an excessive error indication from the memory controller, initiating a complement/recomplement (C/R) error correction method in response to the refetch request for the erroneous data using a first fetch, a first store, a second fetch and a second store of the data, including:

buffering the data and ECC obtained by the first fetch and by the second fetch during the C/R method, and doing a double inversion on at least an erroneous portion of the data in attempting to correct the excessive error;

sending the data to the requesting processor obtained by the second fetch in the C/R method and indicating if the data and ECC contain no error, any corrected hard and/or soft error(s), any corrected excessive hard or soft error(s), any corrected excessive hard or soft error(s), or non-correctable error(s); and pipelining fetch and refetch requests from one or more processors to the storage controller for prioritizing memory accesses for fetch requests and for operations of the C/R method for different data in the memory.

2. A method for handling storage errors as defined in claim 1, the buffering step further comprising:

providing a data buffer and at least one status buffer, entries in the data buffer respectively receiving a plurality of data units of a data line addresses in the memory by a requesting processor, corresponding entries in the status buffer receiving a status indicator of whether or not an excessive error is detected in a data unit in a corresponding entry in the data buffer.

3. A method for handling storage errors as defined in claim 2, the C/R method further comprising the steps of:

microcode-accessing a page map with fields representing page frames in the memory to test the state of a field for a page frame having a currently requested address of the data unit having the excessive error, and setting on the field if found in an off state to indicate an excessive error has been found in the respective page frame.

4. A method for handling storage errors as defined in claim 3, the C/R method further comprising the steps of:

interrupting the requesting processor for executing a software operating system (OS) if the accesses field is found set off.

5. A method for handling storage errors as defined in claim 3, the C/R method further comprising the steps of:

continuing execution of the requesting processor without interruption upon finding the accessed field is set on when the C/R method has corrected an excessive error.

6. A method for handling storage errors as defined in claim 3, the C/R method further comprising the step of:

reporting an excessive error condition to a service processor of the system when an excessive error is first found in any page frame of the memory.

7. A method for handling storage errors as defined in claim 6, the C/R method further comprising the step of:

notifying a service processor if any excessive hard error is found for the page frame containing the current request.

8. A method for handling storage errors as defined in claim 17, the C/R method further comprising the step of:

updating by the service prpcessor of a page map in persistent storage to conform to the page map maintained by microcode in volatile system memory for enabling the service processor to initialize the map in volatile memory.

9. A method for handling storage errors as defined in claim 15, the C/R method further comprising the step of:

notifying OS of special error characters detected in an accessed data unit only if the respective field in the page map is in set off state.

10. A method for handling storage errors as defined in claim 2, the C/R method further comprising:

buffering a data line comprising a plurality of data units and associated ECC (DU+ECC) in which any one or more of the DU+ECC has one or more erroneous bits in the first fetch and second fetch parts of the C/R method; and not inverting any DU+ECC not having an excessive error in any phase of the C/R method, but inverting in the first store and second fetch parts of the C/R method any DU+ECC having an excessive error.

11. A method for handling storage errors as defined in claim 10, enabling a retry of the C/R method in case of failure of hardware used by the C/R method, further comprising:

re-inverting each erroneous DU+ECC being buffered in an inverted form by the buffering step if a hardware failure occurs, but not inverting any non-erroneous DU+ECC, and storing all DU- +ECC in the in their original location in the data line to enable a retry of the C/R method.

12. A method for handling storage errors as defined in claim 2, the C/R method further comprising the steps of:

inverting all bits in a data unit and its ECC for the first store and after the second fetch of the C/R method when the status information indicates an excessive error exists in the data unit and/or ECC; and sending the twice inverted data unit and ECC with status information to the requesting processor after the second fetch of the C/R method, the status information signalling if correction is obtained for the excessive error in the data unit and/or ECC.

13. A method for handling storage errors as defined in claim 12, the C/R method further comprising the steps of:

continuing to execute the current program without interruption in the requesting processor when the C/R method corrects an excessive error in any one or more data units of the data line.

14. A method for handling storage errors as defined in claim 12, the C/R method further comprising the steps of:

providing a plurality of status buffers for containing the same status indication for each data unit in a corresponding entry in the data buffer;

comparing the content of the status buffers for a data unit being accessed in the data buffer; and signalling an error condition for the current operation of the C/R method when the comparing step finds unequal contents for the plural status buffers.

15. A method for handling storage errors as defined in claim 14, the C/R method further comprising the steps of:

also providing a parity bit for each status indication in each entry of the status buffers;

parity-checking the contents of the status buffers for a parity error when the status indication for a data unit is being accessed in all status buffers; and using one of the accessed status indications to control the C/R method only if the parity-checking step indicates no parity error for that status indication.

16. A method for handling storage errors as defined in claim 15, the C/R method further comprising the steps of:

signalling an error condition for the current operation of the C/R method when the parity-checking step finds a parity error for all status indications in the status buffers being accessed for a data unit in the data buffer.

17. A method for handling storage errors as defined in claim 16, the C/R method further comprising the steps of:

re-writing a default status indication indicating no excessive error with a correct parity indication if bad parity is indicated by the parity checking step for any of the status buffers to increase the fault tolerance of the C/R method.

18. A method for handling storage errors as defined in claim 16, the C/R method further comprising the steps of:

monitoring the number of parity errors occuring in the status buffer contents; and generating an interruption to the requesting processor when the monitoring step finds the number of parity errors exceed a predetermined threshold number to indicate repair is needed to means for executing the C/R method.

19. A method for handling storage errors as defined in claim 14, the C/R method further comprising the steps of:

inpointer addressing of corresponding entries in all of the plural status buffers for writing a status indication into all status buffers for the C/R method, and outpointer addressing of all corresponding entries in all status buffers for reading a status indication for a data unit being accessed in the data buffer for the C/R method;

comparing the content of the accessed entries in all status buffer being inpointer addressed or outpointer addressed; and indicating an error condition for the current C/R method if the comparing step does not find an equal comparison of the compared status buffer contents.

20. A method for handling storage errors as defined in claim 19, the C/R method further comprising the steps of:

generating a parity indication for each status indication and including the parity indication with the status indication in the content of each status buffer entry being written.

21. A method for handling storage errors as defined in claim 19, the C/R method further comprising the steps of:

providing an inpointer register for containing the inpointer addressing for each buffer and an outpointer register for containing the outpointer addressing for each buffer;

comparing the content of all outpointer registers required to access corresponding entries in the buffers; and indicating an error condition for the current C/R method if any comparing step does not find an equal comparison of the compared contents of the inpointer registers or of the outpointer registers.

22. A method for handling storage errors, the method comprising the steps of:

fetch requesting by a processor of data from a memory in a data processing system, and responding by a memory controller with the data and indicating any excessive error in the data detected with ECC bits;

refetch requesting by the processor of the data in response to receiving an excessive error indication from the memory controller, initiating a complement/recomplement (C/R) error correction method in response to the refetch request for the erroneous data using a first fetch, a first store, a second fetch and a second store of the data, including:

buffering the data and ECC obtained by the first fetch and by the second fetch during the C/R method, and doing a double inversion on at least an erroneous portion of the data in attempting to correct the excessive error;

sending the data to the requesting processor obtained by the second fetch in the C/R method and indicating if the data and ECC contain no error, any corrected hard and/or soft error(s), any corrected excessive hard or soft error(s), or non-correctable error(s);

detecting for a failure in the hardware performing the C/R method;

indicating a part of the C/R method in which an erroneous data unit and its associated ECC bits are inverted by the C/R method; and re-inverting and storing an erroneous data unit and associated ECC bits in their original location in response to the detecting step detecting a hardware failure if the indicating step finds they are inverted to enable recovery of the data unit and ECC by enabling a retry of the C/R method.

23. A method for handling storage errors as defined in claim 22, indicating step in the C/R method further comprising:

indicating when the phase of the C/R method is in the first store or second fetch of the C/R method.

24. A process for reporting excessive error conditions to a memory map having entries representing page frames in a storage unit in a data processing system, the map entries reporting excessive error conditions detected for respective page frames, comprising the steps of:

fetching in the storage unit by a storage controller of a data unit requested by a processor, and detecting and correcting any errors in the data unit up to a maximum number of correctable errors determined by ECC bits with the data unit for providing a predetermined maximum ECC error-correction capability for each data unit;

invoking in the storage controller complement/re-complement (C/R) error correction operations upon the detection of an excessive error, which comprises multiple errors exceeding the ECC error-correction capability;

re-fetching the data unit to attempt C/R error correction to correct any hard error of the data unit and using the ECC bits to correct any soft error of the data unit;

accessing by the requesting processor of the map, and detecting in the map an entry for a currently accessed page frame, and sensing in the entry for a report field indicating an excessive error condition was previously reported for the current page frame; and interrupting the requesting processor operation for communicating with the control program if the report field does not indicate any excessive error condition was previously reported, and then setting the entry to an excessive error reported state, but not interrupting operation by the requesting processor if the accessed entry indicates an excessive error was previously reported for the page frame.

* * * * *